(12) United States Patent
Kim

(10) Patent No.: US 9,039,204 B2
(45) Date of Patent: May 26, 2015

(54) PROJECTOR HAVING A PROJECTOR LENS PART AND A COVER PART

(75) Inventor: Dong Joong Kim, Gumi-si (KR)

(73) Assignee: LG Electronics Inc., Seoul (KR)

( * ) Notice: Subject to any disclaimer, the term of this patent is extended or adjusted under 35 U.S.C. 154(b) by 966 days.

(21) Appl. No.: 12/739,482

(22) PCT Filed: Oct. 21, 2008

(86) PCT No.: PCT/KR2008/006214
§ 371 (c)(1),
(2), (4) Date: Aug. 16, 2010

(87) PCT Pub. No.: WO2009/054659
PCT Pub. Date: Apr. 30, 2009

(65) Prior Publication Data
US 2011/0037908 A1    Feb. 17, 2011

(30) Foreign Application Priority Data
Oct. 23, 2007 (KR) .................. 10-2007-0106496

(51) Int. Cl.
*G03B 21/14* (2006.01)
*G03B 31/00* (2006.01)
(Continued)

(52) U.S. Cl.
CPC .............. *G03B 21/14* (2013.01); *G03B 21/00* (2013.01); *G06F 1/1605* (2013.01); *H04N 9/3141* (2013.01); *H04N 9/3173* (2013.01)

(58) Field of Classification Search
CPC .... G03B 21/00; G03B 21/003; G03B 21/005; G03B 21/006; G03B 21/008; G03B 21/10; G03B 21/12; G03B 21/132; G03B 21/14; G03B 21/145; H04N 9/00; H04N 9/04; H04N 9/30; H04N 9/31; H04N 9/3102; H04N 9/3105; H04N 9/3108; H04N 9/3111; H04N 9/3114
USPC ......... 353/30, 31, 15, 19, 22, 72, 74, 97, 122, 353/35
See application file for complete search history.

(56) References Cited

U.S. PATENT DOCUMENTS 5,396,301 A * 3/1995 Sasaki et al. .................. 348/794
7,137,709 B2 * 11/2006 Takemi ........................... 353/85
(Continued)

FOREIGN PATENT DOCUMENTS

EP      1 675 393 A2    6/2006
JP      H 11-174598     7/1999
(Continued)

OTHER PUBLICATIONS

European Search Report dated Sep. 20, 2010 issued in Application No. 08 84 0856.
(Continued)

*Primary Examiner* — Pascal M Bui Pho
(74) *Attorney, Agent, or Firm* — KED & Associates LLP

(57) ABSTRACT

A thin type projector is disclosed. The thin type projector according to present invention includes a panel part slidingly mounted at the front surface of the housing to open and close the projection lens part selectively. The thin type projector may further include a speaker part installed at the front surface of a housing, the speaker part converting an audio input signal into sound. When the panel part is separated, a lamp as a light source is exposed to the front of the housing. As a result, a user can replace the lamp with a new one conveniently.

20 Claims, 8 Drawing Sheets

(51) Int. Cl.
*G03B 21/26* (2006.01)
*G03B 21/00* (2006.01)
*G06F 1/16* (2006.01)
*H04N 9/31* (2006.01)

(56) References Cited

U.S. PATENT DOCUMENTS

| | | | |
|---|---|---|---|
| 7,258,468 B2 * | 8/2007 | Peng et al. | 362/362 |
| 7,270,421 B2 | 9/2007 | Shinozaki | 353/69 |
| 2002/0039174 A1 | 4/2002 | Yamada et al. | |
| 2002/0109822 A1 * | 8/2002 | Matsuda et al. | 353/119 |
| 2004/0233400 A1 | 11/2004 | Kyoto et al. | 353/119 |
| 2005/0219474 A1 | 10/2005 | Hara et al. | |
| 2005/0237492 A1 | 10/2005 | Shinozaki | |
| 2006/0203124 A1 * | 9/2006 | Park et al. | 348/376 |
| 2007/0206163 A1 * | 9/2007 | Kuroda | 353/88 |

FOREIGN PATENT DOCUMENTS

| | | |
|---|---|---|
| JP | H 11-174599 | 7/1999 |
| JP | 2001-215618 | 8/2001 |
| JP | 2001-249402 A | 9/2001 |
| JP | 2007-010709 | 1/2007 |

OTHER PUBLICATIONS

Korean Notice of Allowance for Application 10-2007-0106496 dated Dec. 16, 2013.

* cited by examiner

PROJECTOR HAVING A PROJECTOR LENS PART AND A COVER PART

TECHNICAL FIELD

The present invention relates to a thin type projector. More specifically, the present invention relates to a thin type projector which includes a panel part slidingly mounted on a front surface thereof, selectively opening and closing a projection lens part for projecting images.

BACKGROUND ART

Projectors are apparatuses which project enlarged images to a screen via a projection lens once image input signals of various display devices.

Projectors may be categorized into a PRT (CRT) type, liquid crystal display (LCD) type and digital light processing (DLP) type. Recently, LCD type projectors have been popular because of an advantage of connection with PCs.

According to the LCD type projector, light which is generated from a light source lamp passes a transparent LCD panel to display images on a front screen.

FIG. 1 is a perspective view of a conventional projector. The projector shown in FIG. 1 includes a projection lens part 10' provided on a front surface of a wide box shaped housing 20 such that generated images may be projected via the projection lens part.

An optical system of the projector includes a lightening part, a micro device and a projection lens part. The lightening part generates and emits light. The micro device realizes three dimensional images by using the light. The projection lens projects the images. The micro device may be a transparent LCD panel to receive an image input signal from an outside and to display images, if the projector is a LCD type.

The projector 100' shown in FIG. 1 is wide box-shaped with a large horizontal area. As a result, the above projector 100' should be installed on an auxiliary table or on the ceiling. A thin type projector has been introduced with an improvement of the optical system and the thin type projector means a thin box-shaped projector.

FIG. 2 illustrates an embodiment of the thin type projector. This thin type projector 100' includes a projection lens part 10' provided at a front surface of an upright box-shaped housing 20', with an exposed lens.

As shown in FIG. 2, this thin type projector may a stand type which uses a stand 50' or a wall-mount type. Even if this thin projector is a stand type, this thin projector has a small horizontal area than the conventional projector shown in FIG. 1. If it is a wall mount type, this thin type projector is simpler to install than the conventional projector installed in the ceiling.

The thin projector receives an image input signal of various kinds display devices and projects enlarged images to a screen via the projection lens. Here, the various display devices may provide a sound input signal, rather than the image signal. The display devices supply the image signal to a TV, DVD player, portable multimedia player (PMP) or PC. An auxiliary sound device should be provided if it is necessary to amplify a small capacity of a speaker of the display device, for example, a lap top computer and if a portable display device without a speaker is connected with the thin type projector.

While the conventional projector turned on, images are projected from the projection lens part. While the conventional projector is turned off, a separate private usage cover is mounted to the projection lens to protect the projection lens part from dust, scratches or shocks.

DISCLOSURE OF INVENTION

Technical Problem

However, the private usage cover of the projection lens part may happen to be lost and the protection of the projection lens might not be reliable.

Furthermore, if the light source lamp should be replaced, the whole housing is separated to separate the light source lamp, which is inconvenient.

A still further, if the thin type projector shown in FIG. 2 is wall-mounted, all eyes will be on the wall-mounted thin type projector. As a result, it is necessary to consider a design balance of the projector.

Technical Solution

To solve the problems, a thin type projector includes a upright box-shaped housing; a lightening part mounted at a front surface of the housing to expose a lamp light source to the front surface, the lamp light source generating and emitting light; a micro device converting a display input signal received from an outside into a video signal to be projected; a projection lens part mounted at the front surface of the housing to expose a lens unit to the front surface of the housing, the lens unit converting the image, converted from the light of the lightening part by the micro device, into a projection light to enlarge and project the projection light; and a panel part slidingly mounted at the front surface of the housing to open and close the projection lens part selectively.

The thin type projector may further include a speaker part installed at the front surface of the housing, the speaker part being exposable, wherein the panel part selectively opens or closes the projection lens part or the speaker part when the panel part sliding.

The speaker part may be provided in plural, the plurality of the speakers being spaced apart a predetermined distance in a horizontal direction.

The panel part may open and close the projection lens part and the speaker part simultaneously, if the panel part is sliding.

The panel part may open and close either of the projection lens part and the speaker part before the other.

A predetermined portion of the panel part is projected at the front surface of the housing and the panel part may be operated by a pinion gear operated by a motor mounted in the housing and a rack provided at a rear surface of the panel part, the rack engaged with the pinion.

A guide groove may be provided at either of the rear surface of the panel part and the front surface of the housing to guide the sliding motion of the panel part, and a guide protrusion ay be provided at the other to be inserted in the guide groove.

An upward motion prevention switch and a downward motion prevention switch may be pressed to turn off the motor when the panel part is sliding, the upward and downward motion prevention switches being projected from the front surface of the housing by a spring.

The sliding motion range of the panel part may be limited by a prevention protrusion provided at one of the front surface of the housing and the rear surface of the panel part and a limiter provided at the other of the front surface of the housing and the rear surface of the panel part.

The panel part may include a front plate exposed forward, the front panel being replaceable; and a liner defining a rear surface of the panel part.

The front plate may be made of transparent plastic or glass such that a decorative material is inserted between the front plate and the liner.

The panel part may be separable from the housing.

The lamp light source of the lightening part can be separated, when the panel part is separated from the housing.

The panel part may be configured of a display device to display an image identical to the image realized in the micro device.

The speaker part provided at the front surface of the housing may be positioned higher than the projection lens part, and if only an audio signal is supplied from an outside, the panel part is sliding downward to an opening position opening only the speaker part and if a video signal is inputted from the outside, the panel part is sliding downward farther to an opening position for opening the projection lens part below the speaker part.

Advantageous Effects

The present invention has following advantageous effects.

According to a thin type projector of the present invention, a projection lens part is protected from outside stimulus and an auxiliary audio output device is not necessary because an audio input signal is outputted via a speaker part.

Furthermore, it is convenient to replace a light source lamp which is a consumption part with a new one.

A still further, users' various aesthetic demands may be satisfied because a decorative material can be inserted in a panel part or a front plate can be replaceable.

BRIEF DESCRIPTION OF DRAWINGS

The accompanying drawings, which are included to provide further understanding of the disclosure and are incorporated in and constitute a part of this application, illustrate embodiments of the disclosure and together with the description serve to explain the principle of the disclosure.

In the drawings.

BEST MODE FOR CARRYING OUT THE INVENTION

Reference will now be made in detail to the specific embodiments of the present invention, examples of which are illustrated in the accompanying drawings. Wherever possible, the same reference numbers will be used throughout the drawings to refer to the same or like parts.

Figure 3:
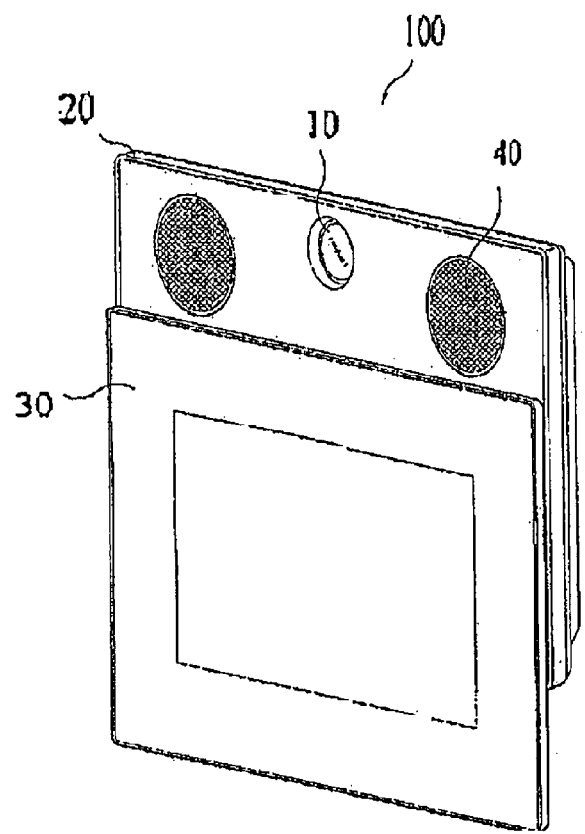
FIG. 3 is a perspective view illustrating a thin type projector according to an exemplary embodiment.

FIG. 3 is a perspective view of a thin type projector according to an exemplary embodiment.

According to the exemplary embodiment shown in FIG. 3, a thin type projector 100 includes a projection lens part 10 and a panel part 30. The projection lens part 10 is mounted at a front surface of a housing 20 which is vertically upright box-shaped, with a lens unit exposed outside via the front surface of the housing to project images generated from a micro device. The panel part 30 is slidingly mounted on the front surface of the housing to selectively open and close the projection lens part 10.

FIG. 3 presents that the panel part 30 of the thin type projector sliding moves upward and downward. If the panel part 30 sliding moves to selectively close the projection lens part 10, the motion is not limited to the upward-and-downward direction and it may be a right-and-left direction.

A lightening part (not shown) is provided in the housing to generate light from the light source lamp and a micro device (not shown) is provided in the housing to receive the light and to realizing images.

If the projection lens part 10 projects images, the panel part 30 is sliding downward to open the projection lens part 10. If the image is projected completely, the panel part 30 sliding upward to close the projection lens part 10. The motion direction and motion distance of the panel part 10 may be determined according to the position of the panel part 30.

The thin type projector 100 can receive and convert a sound input signal into sound to project the sound toward the front surface of the housing. For that, the thin type projector 100 further includes a speaker part 40 exposed to the front surface of the housing.

An auxiliary sound device should be provided in the thin type projector 100, if the display devices transmit a sound input signal as well as an image input signal. If the speaker is mounted on the front surface of the housing 20, the speaker may replace the auxiliary sound device.

Even in case of the display device having a sound signal output part, the speaker part 40 may be usable as the sound output device in a lap top PC with a small capacity of a speaker, which should be amplified, or a portable display device only with an earphone terminal, no speaker.

Figure 4:
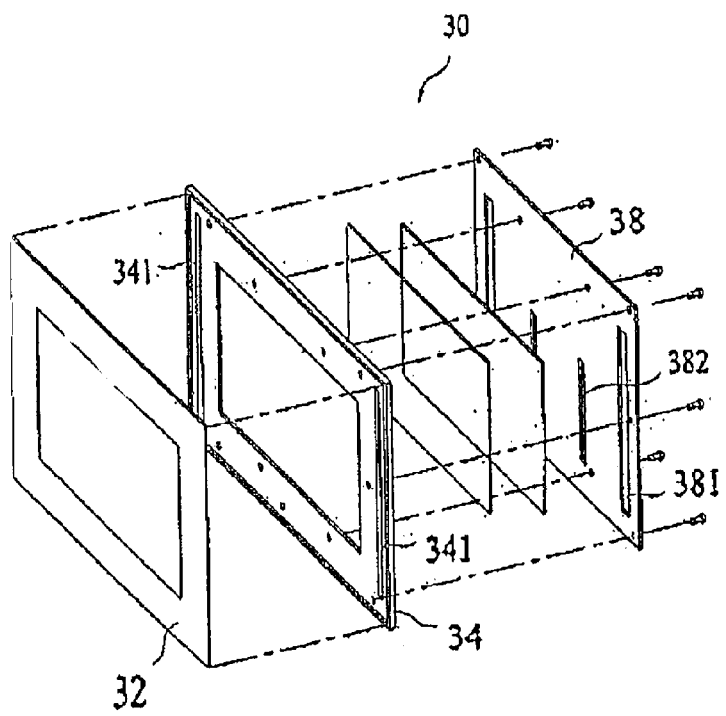
FIG. 4 is an exploded perspective view illustrating an embodiment of a panel part provided in the thin type projector.

FIG. 4 is an exploded perspective view of an example of the panel part 30. The panel part 30 includes a replaceable front plate 32 exposed to its front surface and a liner 38 defining its rear surface. Here, the panel part 30 may be a trim-kit type.

It is preferable that the front plate 32 may be fabricated in various shapes and colors to be selectable according to various demands of users.

Because of the front plate with the various kinds of shapes and colors, various production lines may be possible.

In addition, the front plate 32 is replaceable afterward such that changing user demands of beauty may be satisfied.

The front plate 32 is configured of transparent plastic or glass and a decorative material may be inserted between the front plate 32 and the liner 38. At this time, the decorative material may be a photograph or picture.

The front plate 32 and the liner 38 shown in FIG. 4 may be fastened to a panel frame 34 by a bolt and e.g.

The panel part 30 is mounted on the front surface of the housing 20 and the panel part 30 is slidable upward and downward to selectively open and close the projection lens part 10 and the speaker part 40, if it is provided.

Guide grooves and corresponding guide protrusions may be formed at a rear surface and the front surface of the housing 20, respectively, to guide the sliding motion. According to the embodiment of FIG. 4, the guide grooves 341 and 381 may be provided at the panel part 30. Specifically, the guide grooves 341 and 381 are provided at the panel frame 34 and the liner 38, respectively, such that a single protrusion is inserted in the guide grooves 341 and 381. Alternatively, the positions of the guide groove and the guide protrusion (not shown) may be vice versa, which may create the same performance as the above positions of them.

Figure 5:
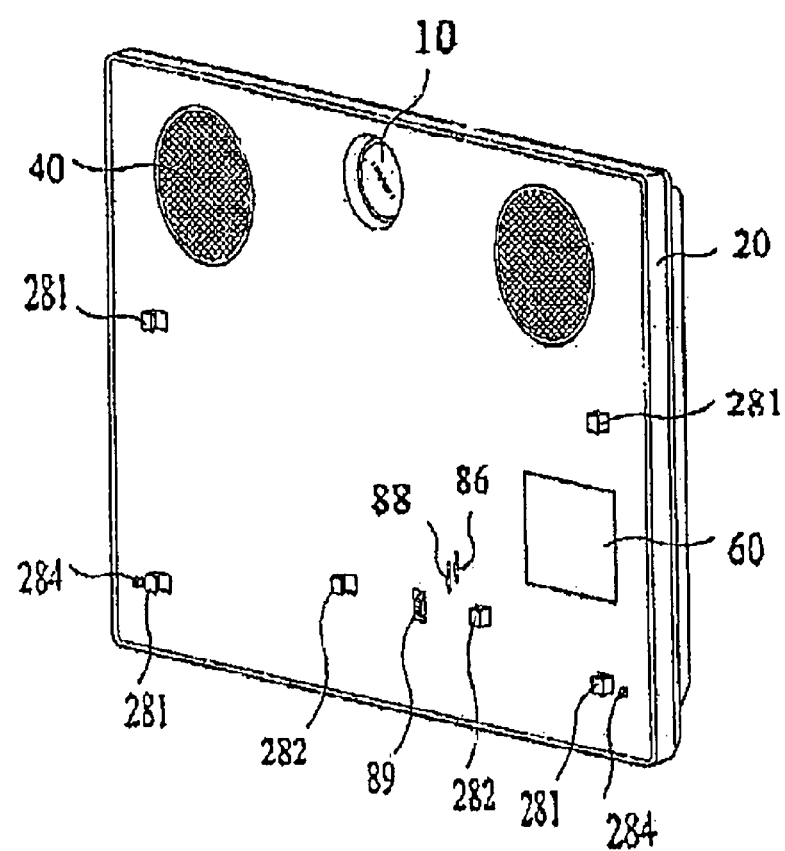
FIG. 5 is a diagram illustrating a front surface of a housing provided in the thin type projector according to the exemplary embodiment.

FIG. 5 is a diagram illustrating the front surface of the housing 20 according to the thin type projector according to the exemplary embodiment. As shown in FIG. 5, guide protrusions 281 and 282 are formed at the front surface of the housing 20. Then, the guide protrusions 281 and 282 are inserted in the above guide grooves 341 and 381 to guide the sliding motion of the panel part 30.

The guide protrusion corresponding to a numeral reference 281 is inserted in the guide grooves 341 and 381 to guide the sliding motion of the panel part 30 and to prevent the panel part 30 from being separated from the housing 20.

The guide protrusion corresponding to a numeral reference 282 is inserted in the guide groove formed at only the liner 38. the guide protrusions and the guide grooves shown in FIGS. 4 and 5 are just examples and they may be changeable in various ways only if they are used as means for allowing the panel part 30 mounted on the front surface of the housing 20 and preventing the panel part 30 from being separated from the housing 20.

Figure 1:
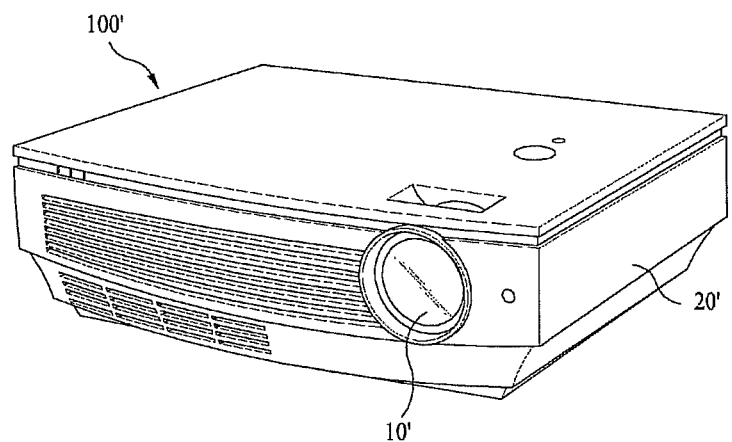
FIG. 1 is a perspective view of a conventional projector.
Figure 2:
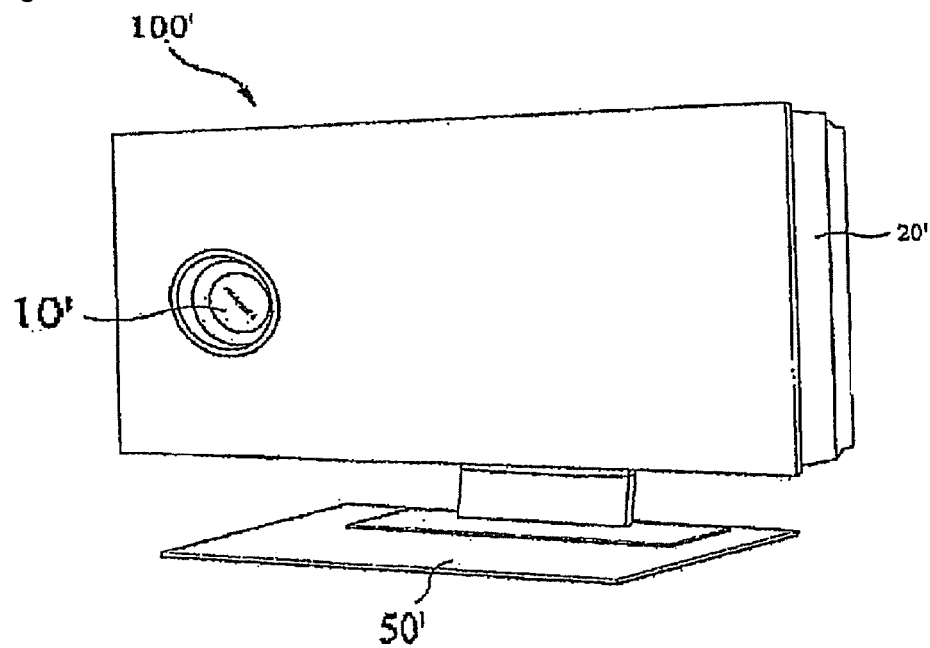
FIG. 2 is a diagram illustrating an example of a thin type projector.

A lightening part 60 is provided in the housing 20 and a lamp (not shown) used as a light source is exposed via the lightening part 60. According to the conventional projector shown in FIGS. 1 and 2, the lightening part is positioned in the housing to generate and emit light. To replace the lamp, the housing should be destructed. It is expected to replace the lamp with a new one regularly, because the lamp used as a light source of the lightening part has limited usage time. However, it is not simple for a user to destruct the housing and to replace the lamp.

The light source part 60 of the thin type protector according to the exemplary embodiment has access to the lamp from the front surface of the housing 20. That is, although a light source lamp of the light source part 60 is accessible from the front surface of the housing 20, the sliding motion range of the panel part 30 is limited not to expose the lamp light source outside during the normal usage of the thin type projector.

If the panel part 30 is separable from the housing 20 when replacing the lamp with a new one, the lamp light source is accessible to replace the lamp without the destruction of the housing 20.

As shown in FIG. 5, a prevention protrusion 284 is provided at the front surface of the panel part 30 to prevent the panel part 30 from sliding over the normal sliding motion range. A function and work of the prevention protrusion 284 will be described in reference to FIG. 6.

Figure 6:
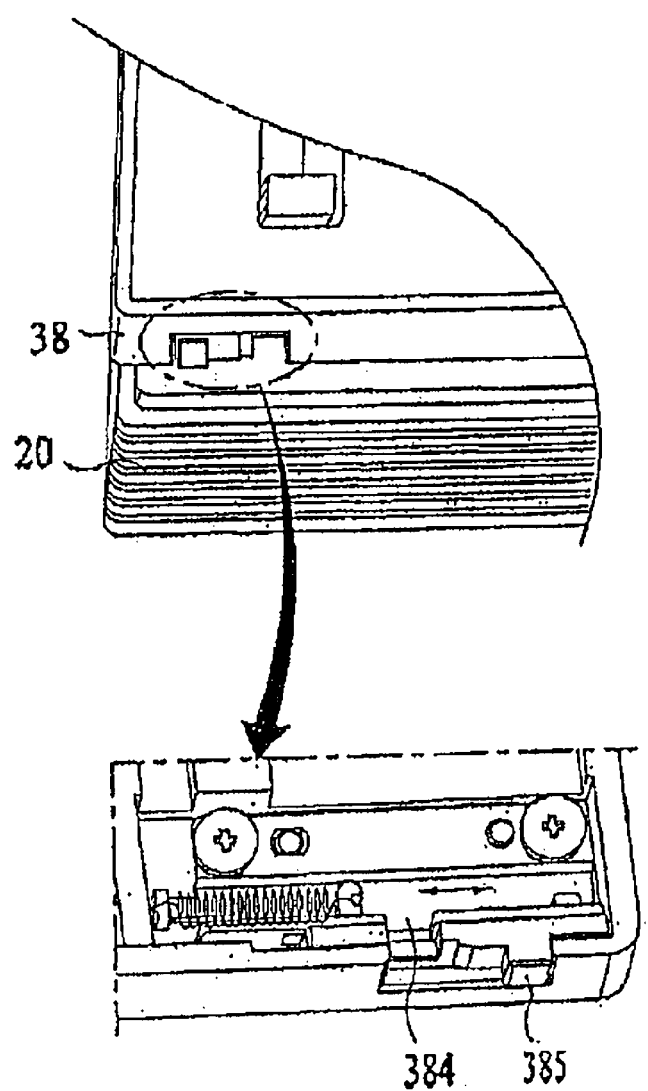
FIG. 6 is a perspective view and enlarged view illustrating a cut-off switch limiting the panel part from moving upward.

FIG. 6 is a perspective view of a switch and an enlarged view of a rear surface of the switch.

If a forward-and-backward movable switch 385 provided at both lower ends of the liner 38 of the panel part 30 closes an opening hole 384 provided at a lower edge of the liner 38, the switch 385 to prevent the panel part 30 from moving upward over the allowable sliding motion range.

A power of the motor is turned off by an upward motion prevention switch 86, which will be described later, and a rotation of a pinion gear 89 is stopped to prevent the upward motion of the panel part 30. At this time, the prevention switch 385 prevents the additional upward motion of the panel part 30 to complement problems of power cut-off control failure and e.g.

However, the prevention switch 385 moves backward if the panel part 30 is separated from the housing, such that the panel part 30 may move upward over a position of closing the projection lens part 10.

Figure 7:
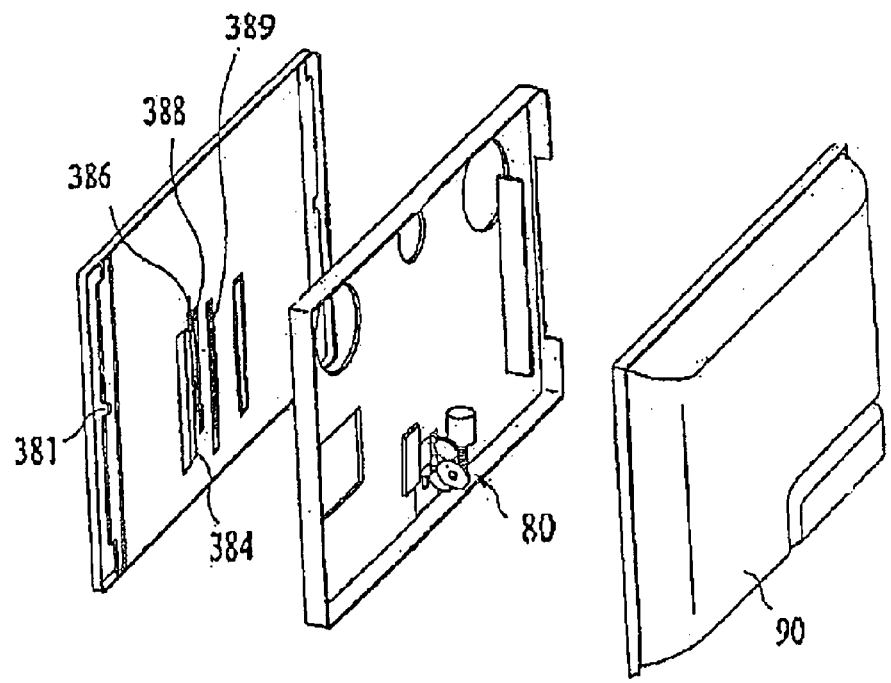
FIG. 7 is an exploded perspective view of the housing and the panel part.

FIG. 7 is an exploded perspective view illustrating the housing and the panel part. Lower ends of the guide grooves 381, 382 and 341 are cut out partially (not shown specifically in the drawings) such that the guide protrusions 281 and 282 having a cross section of a '⊐' shape may be separated from the guide grooves. Although not shown in the drawings, an external input terminal or button type control signal input part may be provided at a side or lower surface of a rear cover 90 composing the housing 20.

In the above process, the panel part 30 is separated from the housing 20 and the user can replace the lamp of the light source part 60.

Figure 8:
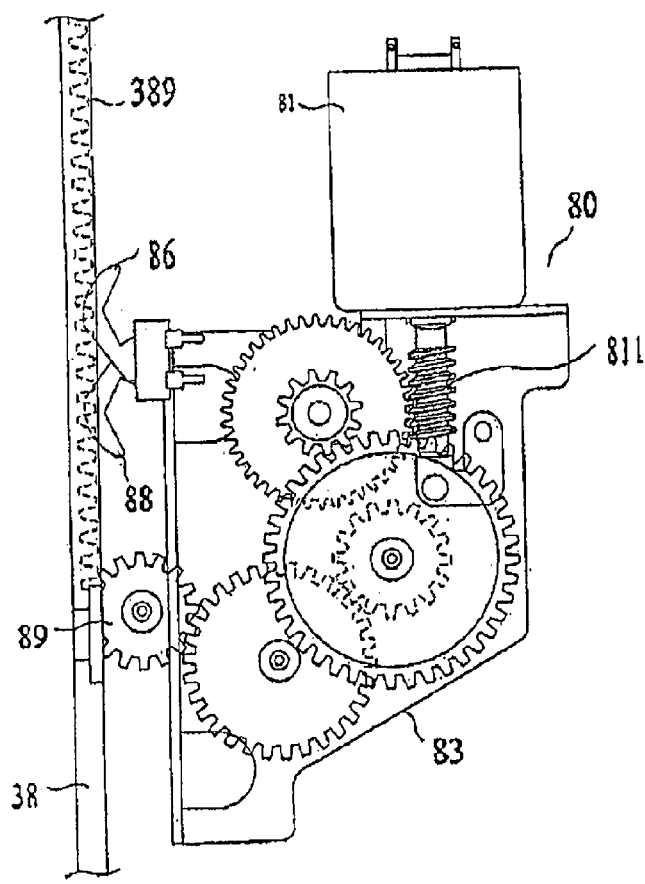
FIG. 8 is a diagram illustrating an operation part provided in the housing to slide the panel part.

FIG. 8 illustrates an operation part 80 provided in the housing 20 to slidingly move the panel part 30.

The rotational force of a motor 81 of the operation part 80 is transmitted to the front surface of the housing 20 and some of the rotational force is transmitted to the projected pinion gear 89, and then the pinion gear 89 is coupled to a rack 389 provided at a rear surface of the liner 38 and the rotational force of the pinion gear 89 is transmitted to the rack 389, only to sliding move the panel part 30 upward and downward.

The operation part 80 includes a gear box 83 which converts a rotation speed of the motor 81 rotated by electric currents.

The rotational force of the motor 81 is transmitted by a worm gear 811 and thus load generated by an abnormal operation of the panel part is not transmitted to the motor 81.

If a direction of the electric currents supplied to the motor 81 is changed, it is possible to move the panel part 30 to an opening position from a closing position of the projection lens part 10 or vice versa.

If the motor 81 is configured of a direct current (DC) motor, the change of the electric current direction may enable the change of the rotation direction of the motor.

A sound or display signal of the display device and an on-signal of the projector may be used as an electric current supply signal for operating the motor 81.

If a display, sound or on-signal is transmitted from the outside, with the panel part 30 of the projector according to the exemplary embodiment being placed at a closing position of the projection lens part 10 and the speaker 40, a display, sound or on-signal is used as an electric current supply signal of the motor 81 and the electric current is supplied to the motor 81. Because of the operation of the motor 81, the panel part 30 is sliding upward to an opening position of the projection lens part 10.

In reverse, if the display or sound signal transmitted from the outside is cut off or an off-signal is transmitted, with the panel part 30 being placed at the opening position, the cut-off display or sound signal or the off-signal is used as a signal of electric current supply and electric currents are supplied to the motor 81 in the opposite direction. As a result, the panel part 30 is sliding to the opening position of the projection lens part 10.

As mentioned above, the signal of the electric current supply may be the display signal, sound signal, which are transmitted from the display device, or on-signal. A signal of cut off the electric currents is transmitted from a first switch 86 and a second switch 88 which are projected from the housing.

The first switch 86 stops the upward motion of the panel part 30 and the second switch 88 stops the downward motion of the panel part 30. The first and second switches 86 and 88 are not pressed, while they are inserted in first and second grooves formed at a rear surface of the liner 38 shown in FIG. 7, respectively. Once the normal motion of the panel part 30 is complete, the first and second switches 86 and 88 are out of the first and second grooves 386 and 388. The switches out of the grooves, respectively, are pressed. If the switches are pressed, it is identified that an electric current cut off signal is generated.

Figure 9:
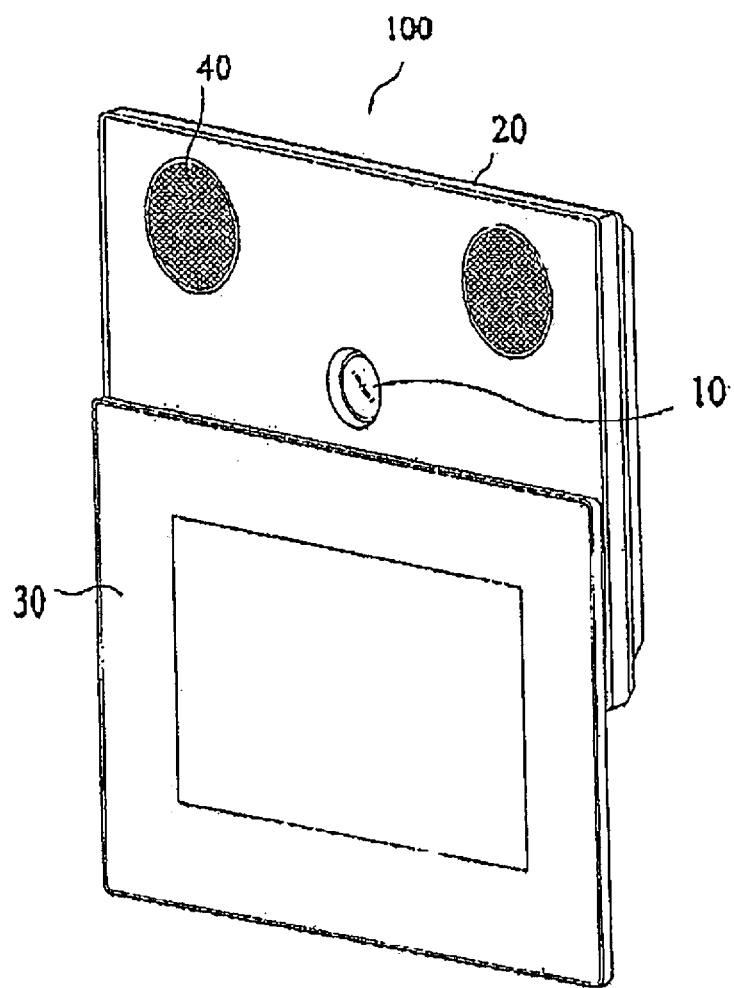
FIGS. 9 and 10 are diagrams illustrating a thin type projector according to another embodiment.
Figure 10:
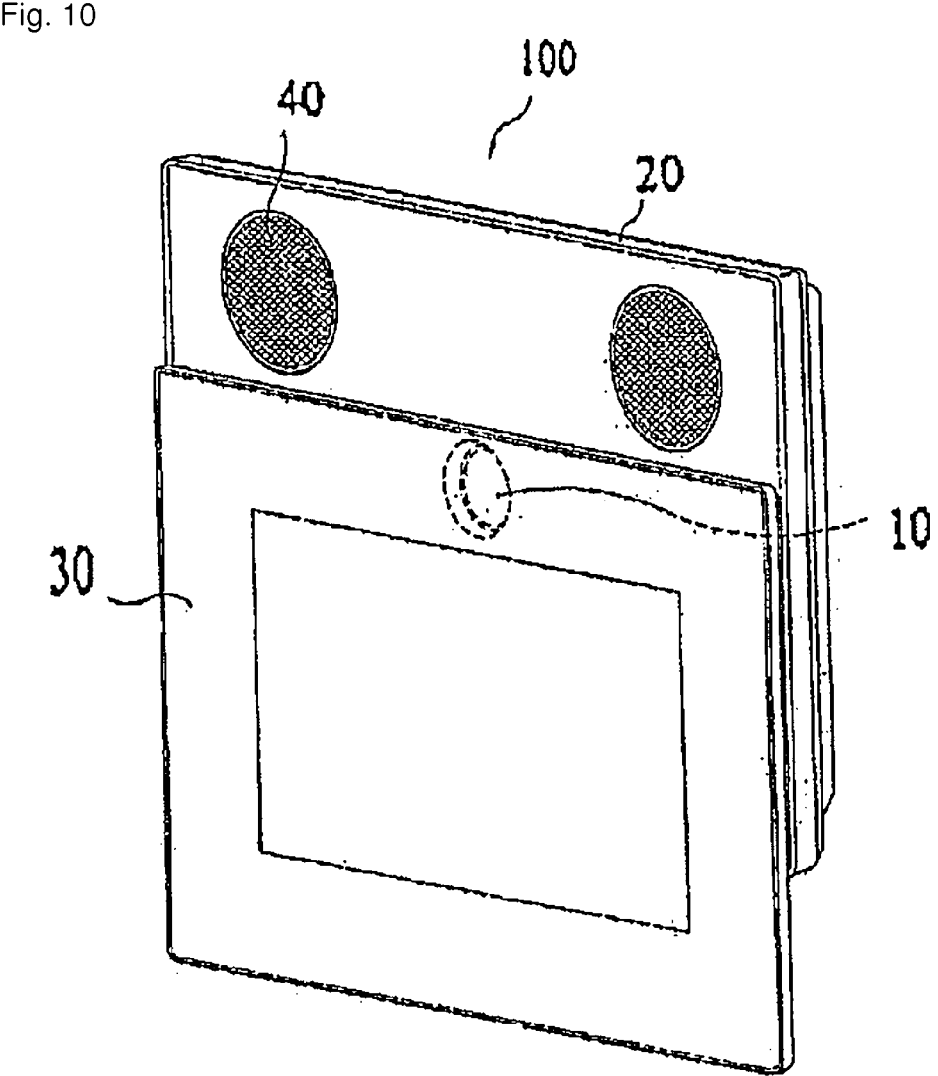

FIGS. 9 and 10 illustrate a thin type projector according to other embodiments, respectively. according to the above embodiment, the thin type projector includes the panel part 30 capable of selectively closing the projection lens part 10 and the speaker part 40 is arranged in parallel with the projection lens part 10 to be opened or closed together with the projection lens part 10 according to the sliding motion of the panel part 30.

However, if only the sound signal is inputted without the display signal received from an external input terminal, the projection lens part 10 does not have to be opened and only the speaker part 40 has to be opened. Then, if the panel part 30 opens only the speaker part, the thin type projector 100 according to the present invention may have an independent function of sound output.

As a result, if the display signal or sound signal is not received from the input terminal, a control part controlling each configuration of the thin type projector may controls the motor such that the panel part 30 closes both the projection lens 10 and the speaker part 40 to protect the projection lens 10 and the speaker part 40 from foreign matters.

In addition, if the display signal is transmitted from the input terminal, the control part may control the motor such that the projection lens part 10 is exposed as shown in FIG. 9. According to the embodiment shown in FIG. 9, the speaker part 40 is positioned higher than the projection lens part 10 and the speaker part 40 is also exposed only with the display signal transmitted from the input terminal.

That is, the reason why the panel part 30 is opened gradually under the control of the control part is that the projection lens part 10 or the speaker part 40 which is not used often is not exposed for a long time. As a result, only the used configuration is exposed according to the position or input signal of the projection lens part 10 or the speaker part 40 and the control part control the motor to determine the sliding motion position of the panel part 30.

According to the thin type projector shown in FIGS. 9 and 10, two speaker parts 40 are provided on an upper portion of the front surface of the housing 20 and the projection lens part 10 is provided at a lower portion, compared with the speaker parts 40.

If the display signal is inputted, the panel part 30 is sliding to the opening position to open both the speaker parts 40 and the projection lens part 10 from the closing position to close the whole portion of the housing 20 (see, FIG. 9). If only the sound signal is inputted, the panel part 30 is sliding to the opening position to open only the speaker parts 40 as shown in FIG. 10, because the projection lens part 10 does not have to be opened.

In contrast to the embodiment of FIGS. 9 and 10, it is possible to exchange the positions of the projection lens part 10 and the speaker part 40 at the front surface of the housing 40. Even if then, the sliding motion position of the panel part 30 may be determined according to the kind of the input signal received from the outside.

Figure 11:
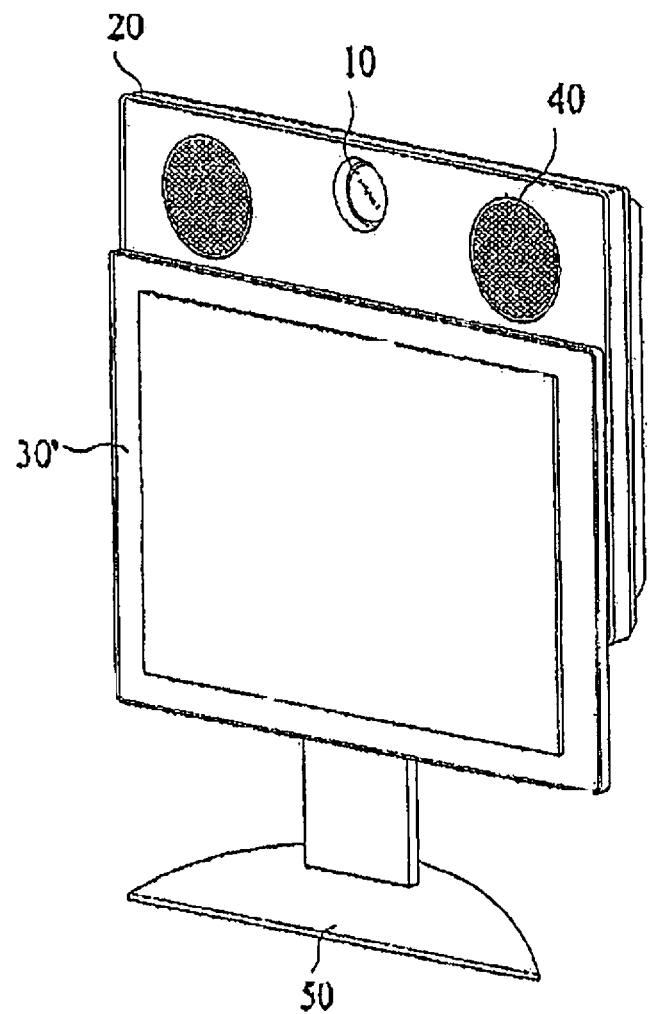
FIG. 11 is a diagram illustrating a thin type projector according to a still further embodiment.

FIG. 11 illustrates a thin type projector according to a still further embodiment. According to the thin type projector shown in FIG. 11, the panel part sliding upward and downward to close the projection lens part 10 and the speaker part 40 may be a flat panel display (FPD) 30'. As mentioned above, the embodiment shown in FIG. 11 presents that the thin type projector is installed on a stand 50 and it may be wall-mounted.

If the panel part is the flat panel display device 30', there may be following advantages. First, the display signal may be displayed via the FPD device 30' the display signal is projected via the projection lens 10 simultaneously.

In this case, to the FPD device 30' is transmitted via a cable the signal which is identical to the display signal received from the external display device to be supplied to the micro device. For that, a through hole (not shown) is formed at the front surface of the housing 20 and the cable pass the trough hole to supply the display signal and the on-signal to the FPD device 30'.

This can give the thin type projector according to the present invention an advantage in that the user can identify the image projected from the projector lens part. Also, if the display device is configured of a LCD device having a touch screen open frame or a LCD device having a touch screen sensor, the user can control a computer connected as the external input device via the FPD device 30'. That is, the user can identify the image output of the computer and the projected image simultaneously.

According to the embodiment of the thin type projector shown in FIG. 11, the external input is displayed via the FPL device 30' with the panel part 30 being at the closing position to close the overall the housing 20. As a result, the thin type projector according to this embodiment may be used as a monitor of a computer, e.g.

It is preferable that the display signal input transmitted from the external device is selectively outputted via the projection lens part 10 or the FPD device 30' and via both of them. This selection may maximize utilization of the thin type projector.

To embody the above function, the thin type projector may include a HDMI terminal, a RCA terminal, an S-video terminal, an analog RGB (D-sub) terminal and DVI terminals. In addition, the thin type projector includes a sound signal input terminal to receive a sound signal.

Except the input terminals such as HDMI terminal which transmits the display signal together with the sound signal, the display input terminals such as Analog RGB (D-sub) which transmits the display signal not together with the sound signal may be used as display input terminal. If then, an auxiliary sound signal cable is connected with the display device and the sound input terminal of the thin type projector such that the sound signal is outputted via the speaker part 40.

Moreover, if the thin type projector includes a DVD player, a reproduction circuit having a multimedia reproduction program and external memory receiving terminals such as USB terminal, the thin type projector can directly play multimedia files inputted from the memory receiving terminal. As a result, the thin type projector may be utilized as an independent multimedia device.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A projector comprising:
    a box-shaped housing, the housing having guide protrusions at a front surface of the housing;
    a lightening part mounted at the front surface of the housing;
    a projection lens part mounted at the front surface of the housing;
    a cover part slidingly mounted at the front surface of the housing to open and close the projection lens part selectively;
    a speaker part installed at the front surface of the housing, the speaker part being exposable;
    guide grooves provided at a rear surface of the cover part, the guide protrusions at the front surface of the housing to be inserted into the guide grooves; and
    locking levers provided at both lower ends of the cover part, the locking levers to close or open holes, the locking levers to prevent the cover part from moving upward when the holes are closed by the locking levers, and the locking levers to enable the cover part to move upward for being separable from the guide protrusions of the housing when the holes are opened by the locking levers,
    wherein the cover part selectively opens or closes the projection lens part, when the cover part is sliding in a downward direction or an upward direction, and
    wherein the cover part opens the projection lens part when the cover part slides in a downward direction according to one of an audio signal, a video signal or an on-signal of the projector, and the cover part closes the projection lens part when the cover part slides in an upward direction according to one of an audio signal, a video signal or an off-signal of the projector.

2. The projector as claimed in claim 1, wherein the speaker part is provided in plural, the plurality of the speaker parts being spaced apart a predetermined distance in a horizontal direction transverse to the downward direction or the upward direction.

3. The projector as claimed in claim 1, wherein the cover part opens and closes the projection lens part and the speaker part simultaneously, when the cover part is sliding in the downward direction or the upward direction.

4. The projector as claimed in claim 1, wherein the cover part opens and closes one of the projection lens part and the speaker part, before the other one of the projection lens part and the speaker part.

5. The projector as claimed in claim 4, wherein the speaker part provided at the front surface of the housing is positioned higher than the projection lens part and when only the audio signal is supplied from the outside of the projector, the cover part is sliding downward to an opening position for opening only the speaker part and when the video signal is inputted from the outside of the projector, the cover part is sliding downward farther to an opening position for opening the projection lens part positioned lower than the speaker part.

6. The projector as claimed in claim 1, wherein a predetermined portion of the cover part is projected at the front surface of the housing and the cover part is operated by a pinion gear operated by a motor mounted in the housing and a rack provided at a rear surface of the cover part, the rack engaged with the pinion.

7. The projector as claimed in claim 6, wherein one of the guide grooves is provided at the rear surface of the cover part to guide the sliding motion of the cover part, and one of the guide protrusions is provided at the front surface of the housing to be inserted in the guide groove.

8. The projector as claimed in claim 6, wherein a upward motion prevention switch and a downward motion prevention switch are pressed to turn off the motor when the cover part is sliding, the upward and downward motion prevention switches being projected from the front surface of the housing by a spring.

9. The projector as claimed in claim 1, wherein the sliding motion range of the cover part is limited by a prevention protrusion provided at one of the front surface of the housing and the rear surface of the cover part, and a limiter provided at the other one of the front surface of the housing and the rear surface of the cover part.

10. The projector as claimed in claim 1, wherein the cover part comprises:
    a front plate exposed forward, the front plate being replaceable; and
    a liner defining a rear surface of the cover part.

11. The projector as claimed in claim 10, wherein the front plate is made of transparent plastic or glass such that a decorative material is inserted between the front plate and the liner.

12. The projector as claimed in claim 1, wherein the cover part is separable from the housing.

13. The projector as claimed in claim 12, wherein the cover part is configured of a display device to display an image identical to the image realized in the projection lens part.

14. The projector as claimed in claim 1, wherein the cover part is in a first position when the cover part closes the projection lens part, and the cover part is in a second position when the cover part opens the projection lens part.

15. A projector as claimed in claim 14, wherein the first position of the cover part is a higher position in the upward direction than the second position of the cover part.

16. The projector as claimed in claim 1, further comprising:
    cut out portions provided at lower ends of the guide grooves,
    wherein the guide protrusions are configured to have a cross section of a '⌐' shape in a horizontal plane, and
    wherein when the cut out portions of the guide grooves move to the guide protrusions, the cover part is capable of being separated from the housing.

17. The projector as claimed in claim 1, wherein the lightening part includes a lamp light source capable of being replaced, and
    wherein the cover part is separable from the housing, and when the cover part is separable from the housing, the lamp light source is exposed at the front surface of the housing.

18. A projector comprising:
    a box-shaped housing;
    a lightening part mounted at a front surface of the housing;
    a projection lens part mounted at the front surface of the housing;
    a cover part slidingly mounted at the front surface of the housing to open and close the projection lens part selectively, and
    a speaker part installed at the front surface of the housing, the speaker part being exposable,
    wherein the cover part selectively opens or closes the projection lens part or the speaker part, when the cover part is sliding,
    wherein the speaker part provided at the front surface of the housing is positioned higher than the projection lens part and when only an audio signal is supplied from an outside, the cover part is sliding downward to an opening position for opening only the speaker part and when a video signal is inputted from the outside, the cover part is sliding downward farther to an opening position for opening the projection lens part positioned lower than the speaker part.

19. A projector as claimed in claim 18, wherein the cover part is in a first position when the cover part closes the projection lens part, the cover part is in a second position when the cover part is in the opening position for opening only the speaker part, and the cover part is in a third position when the cover part is in the opening position for opening the projection lens part that is positioned lower than the speaker part.

20. A projector as claimed in claim 19, wherein the first position of the cover part is in a vertically higher position than the second position of the cover part in the upward direction, and the second position of the cover part is in a vertically higher position in the upward direction than the third position.

* * * * *